Aug. 24, 1965  H. J. STRAUSS  3,202,733
METHOD OF MAKING MICROPOROUS PLASTIC
Filed March 6, 1962

United States Patent Office 3,202,733
Patented Aug. 24, 1965

3,202,733
METHOD OF MAKING MICROPOROUS PLASTIC
Howard J. Strauss, Elkins Park, Pa., assignor to ESB-Reeves Corporation, a corporation of Delaware
Filed Mar. 6, 1962, Ser. No. 177,795
13 Claims. (Cl. 264—49)

This invention relates to a method of making microporous plastics and has for an object the preparation of microporous plastics having softening points significantly higher than 300° F., such as fluorocarbon resins.

The preparation of plastics having softening points significantly higher than 300° F. has not been prepared in microporous form by an extractive process due to the difficulty of dispersing a pore-forming agent in a plastic having such an extremely high melting point. The plastics in the group generically known as fluorocarbon resins have such high melting points. Fluorocarbon resins, as well known in the art, include such plastic materials as polytetrafluoroethylene (sold commercially under the trademark Teflon) and a polychlorotrifluoroethylene (sold commercially under the trademark Kel-F) and equivalents, such as described in Modern Plastics Encyclopedia Issue for 1961 and in the book entitled "Fluorocarbons," by Rudner, published by Reinhold Publishing Corp., New York (1958).

The principal manner in which such plastic materials as Teflon TFE (polytetrafluoroethylene) or Teflon FEP (copolymer of tetrafluoroethylene and hexafluoropropylene) have heretofore been made porous is by the sintering of the particulate plastic after it has been laid down in the form of a sheet. This prior process is difficult to carry out properly, produces poor strength, non-uniform pore structure and rather large pores which are unsuitable for many purposes.

The present invention is directed to the method of producing a truly microporous form of plastic by an extractive method which enables the size of the pore structure to be accurately controlled and at the same time permits the microporous plastic to be produced in substantially any physical shape desired.

In accordance with the present invention, there is provided a method of making microporous plastic including the steps of impregnating a porous metal form with a fine dispersion of the plastic in water and drying the form to remove the water while leaving a residue of the plastic in the pores of the metal form. The plastic impregnated form is heated to a temperature and for a period of time sufficient to fuse the plastic in the pores of the metal form and the metal is thereafter removed from the plastic impregnated form by dissolution thereby producing a microporous plastic having a geometric shape corresponding to the original porous metal form and having a pore structure corresponding in volume to the metal in the original form plus the volume of the water which was removed by drying.

The method is particularly adapted for making microporous fluorocarbon resin which is particularly suited for use as electrolytic diaphragms and corrosion-resistant linings.

For a more detailed understanding of the invention and for further objects and advantages thereof, reference is to be had to the following description taken in conjunction with the accompanying drawings in which.

In making a microporous plastic in accordance with the present invention, it is first necessary to prepare a microporous form of the desired shape and of a material which is capable of being heated to the fusion temperature of the plastic. For convenience the present invention will be described in connection with the method of producing microporous Teflon although it is to be understood that this method is applicable to other microporous plastic materials and particularly other microporous plastic materials having softening points significantly higher than 300° F. such as fluorocarbon resins.

Figure 1:
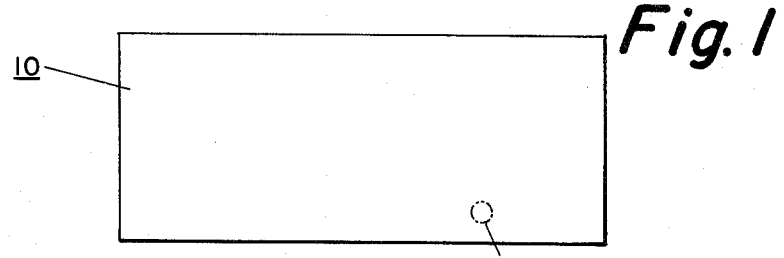
FIG. 1 is a diagrammatic view of a porous metal form useful in practicing the method of the present invention.

In regard to Teflon, the fusion temperature is in the order of 750° F. and thus the microporous form 10 of FIG. 1 must be made of a material capable of being heated to at least 750° F. Several materials for the microporous form may be used, but a preferred material and one which has been used by thee applicant to make microporous Teflon is a sintered plaque of carbonyl nickel. Other suitable materials for the microporous form diagrammatically illustrated as sheet 10 in FIG. 1 are a plaque of carbonyl iron and also plaques of various sintered powdered metals. Carbonyl is used because it produces plaques of very low density. Other porous metal forms may be used, such for example as porous steel, although the density of the latter is substantially higher than the density of carbonyl.

While the porous metal form 10 of FIG. 1 has been shown in the form of a sheet, it is to be understood that the porous metal form may be made in any desired shape including tubular shape. After the porous metal form 10 has been made into the desired shape, it is impregnated with an aqueous dispersion of the plastic. Such a dispersion of Teflon is available commercially under the name Teflon 30, see pages 90–96 of "Fluorocarbons" by Rudner. This is a fine dispersion of Teflon in water, i.e., very small particles of tetrafluoroethylene resin suspended in water. The dispersion is a hydrophobic, negatively charged colloid averaging about 0.5 micron in diameter. It usually contains about 59–61% by weight Teflon as solids, and is stabilized with a non-ionic wetting agent. The particle size of the Teflon is considerably smaller than the pore opening in the porous nickel plaque or form 10. It is important that this relationship of pore size be maintained when using other plastics or other porous metal forms, i.e., the particle size of the plastic must be smaller than the pore openings in the porous metal forms. To provide this relationship, the ratio of the average particle size of the metal powder to the average particle size of the plastic should be about 10 to 1 or greater. In other words, with a Teflon dispersion the particle size of the metal powder should have an average diameter of five microns or more. If a smaller ratio were used the impregnation would not be sufficiently uniform.

Figures 2, 3:
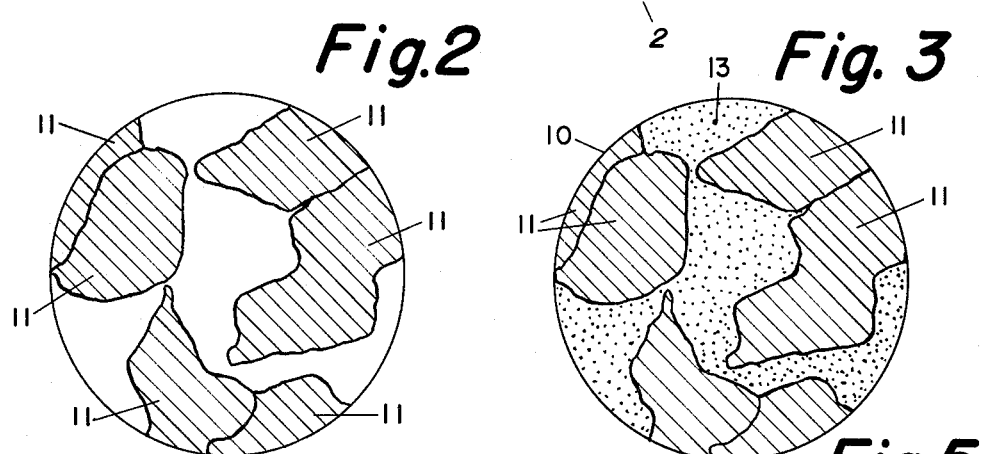
FIG. 2 is a fractional view of a portion of FIG. 1 enlarged many times to show the porous metal structure of the form in FIG. 1.
FIG. 3 is a view similar to FIG. 2 with the porous metal impregnated with a fine dispersion of plastic in water.

The microporous structure of the porous metal form 10 is shown on enlarged scale in FIG. 2. The metal particles 11 of the form have been sectioned for metal and the un-sectioned portions of FIG. 2 represent the void areas.

In FIG. 3 it will be seen that the porous metal form 10 has been impregnated with a fine dispersion of the plastic in water i.e. Teflon 30. The plastic has been indicated by the small dots 13 and in combination with the water fills the void areas between the metal particles 11. In order to more thoroughly impregnate the metal form 10 with the Teflon 30 dispersion, the impregnation is assisted by subjecting the impregnation operation to a high vacuum, for example in the order of 28" of mercury.

After the form 10 has been impregnated with the Teflon 30 dispersion, it is carefully dried so as to eliminate the water associated with the Teflon 30 dispersion thereby leaving a residue of Teflon TFE in the pores of the metal form 10. This residue is indicated at 13 in FIG. 4. The drying operation is accomplished by heating the impregnated metal form to a temperature within the range of about 100° F. to 160° F. and substantially below the boiling point of water to assure proper distribution of residues.

Figures 4, 5:
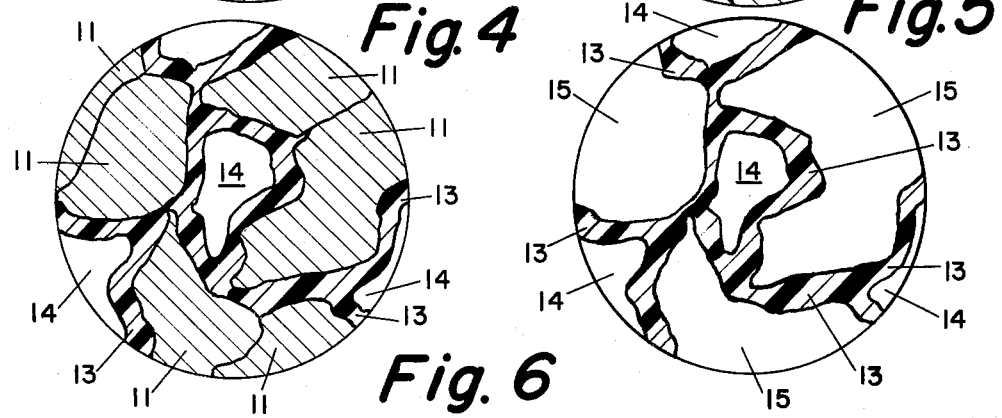
FIG. 4 is a view similar to FIGS. 2 and 3 showing the residue of plastic in the pores of the metal form.
FIG. 5 is a view similar to FIG. 4 showing the fused microporous plastic after the removal of the metal by dissolution.

As will be seen in FIG. 4, the plain areas 14 represent the voids resulting from the drying operation and these voids 14 are of substantially less area than the original void areas in the porous metal form 10 illustrated in FIG. 2. After the metal form 10 has been dried leaving a porous structure including metal particles 11 and a residue of Teflon TFE as indicated in FIG. 4, the metal form 10 is then subjected to temperatures and for a period of time which will fuse the Teflon. For example, the Teflon will fuse when subjected to a temperature in the order of 750° F. for a period of about one hour. After the Teflon has been fused, the pore structure of the impregnated form 10 will continue to be similar to that shown in FIG. 4, the essential difference being that the Teflon is now in a fused state.

After the fusion step the metal form 10 will include continuous phases of metal, Teflon and air. In order to be sure to expose the metal at the surfaces, the surface of the impregnated form is prepared by light sanding such as with a fine emery paper. The next step is to remove the metal from the plastic impregnated form. This may be accomplished either by chemical or electrolytic dissolution. For example, with a nickel form, the nickel may be removed by making the form an anode in a bath of dilute sulphuric acid. A suitable electrolyte may have a strength in the order of 10% sulphuric acid. A suitable voltage across the electrodes may be in the order of two volts D.C. The electrolyte may be changed when the dissolution action slows up. Such electrolytic dissolution is preferred since no gas is produced. The nickel may also be dissolved chemically, such as in a solution of hydrochloric acid or a solution of hydrochloric acid and nitric acid, the latter being known generally by the term "aqua regia." This will dissolve the nickel in the form 10 but hydrogen is produced and remains in the pores of the form and slows down the action. Since the metal or nickel phase is continuous, it can be completely removed in the foregoing manner leaving voids 15 and 14 which together represent the volume of the metal form plus the volume of the water which was removed by the drying operation. The voids 15 produced by dissolution of the metal particles are illustrated in FIG. 5 where it will be noted that the metal particles 11 have been eliminated from the microporous form 10 and all that remains is the Teflon structure 13. In this way a "negative" image of the original pore structure of the metal plaque, FIG. 2, modified by the voids 14, produced by the evaporation of water after the original impregnation, is obtained.

The variations that are inherent in this process will permit the preparation of microporous plastic having functional temperatures in excess of 500° F. As pointed out above, the microporous plastic need not be prepared in sheet form, but rather can be prepared in any form in which porous metals can be made. The technology of making carbonyl iron plaques is such that practically any physical shape can be made and the physical form of the resultant microporous plastic will of course reflect the geometrical properties of the metal plaque or form from which it was made.

The present invention is particularly suited for making electrolytic diaphragms which are corrosion resistant and have the desired microporous characteristics. The pore size of the resulting microporous plastic may be controlled in various ways. In the first place, the pore size may be controlled by the pore structure of the porous metal form 10. Secondly, the pore size may be controlled by the concentration of the Teflon dispersion. For example, to provide greater voids in the end product more water is used in the dispersion. To provide smaller voids in the end product, less water is used in the dispersion. The pore size may also be controlled by the number of impregnations of the porous metal form 10: the higher the number of impregnations, the smaller the resulting pore size in the end product. Lastly, the pore size in the end product may be controlled by impregnating the form after it has been sintered so as to fill up some of the voids with inert material. Thus, the unsintered plastic or Teflon will be present as a filler when the form is impregnated after the sintering operation.

Figure 6:
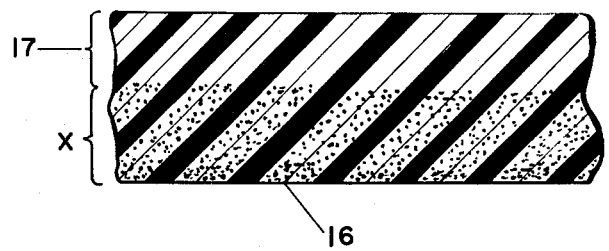
FIG. 6 is a diagrammatic view showing a layer of microporous plastic having a layer of non-porous plastic laminated or otherwise secured to one side thereof.

While the present invention is applicable to various uses where the entire Teflon structure is microporous, it is also applicable to uses where only one side of the strucure is microporous, such as for example as in corrosion resistant linings. In this latter application, it is desirable that one side of the corrosion resistant lining be microporous so that it may be readily adhesively secured to the inside of a metal container but the opposite side or surface of the Teflon lining should be solid or nonporous so as to prevent passage of the corrosive material through the lining. A product of this type is illustrated in FIG. 6 where the porous Teflon surface is indicated at 16 whereas the non-porous Teflon surface is indicated at 17. To prepare a sheet such as illustrated in FIG. 6 the microporous portion indicated as layer X is produced in the foregoing manner described in connection with FIGS. 1–5. If a thin non-porous layer of Teflon is desired on one side of the porous layer X such thin non-porous layer may be produced by coating the one side with Teflon 30, drying the coating, and then applying a second coating, followed by subsequent drying and repeating the coating and drying operation until the desired thickness is obtained.

Where a relatively thick non-porous coating of Teflon is desired at 17, this may be obtained by laminating a solid Teflon sheet to the porous sheet X by pressing the two sheets together and heating them to the fusion temperature of Teflon. In this embbodiment, the laminating step should be performed when the microporous plastic is in the form illustrated in FIG. 4, i.e., before the metal has been removed. After the sintering or fusion of the non-porous Teflon layer to the layer of Teflon and metal og FIG. 4, the laminated or fused sheet is then subjected to the step of dissolution to remove the metal either electrolytically or chemically in the manner described above.

It is to be undestood that the invention is not limited to the specific arrangements shown that changes and modificattions may be made within the scope of the appended claims.

What is claimed is:

1. A method of making microporous plastic having a functional temperature in excess of 500° F. comprising the steps of impregnating a porous metal form with a fine dispersion of the plastic in water, drying the form to remove the water while leaving a residue of the plastic in the pores of the metal form, heating the plastic impregnated form to a temperature and for a period of time sufficient to fuse the plastic in the pores of the metal form, and removing the metal from the plastic impregnated form by dissolution thereby producing a microporous plastic having a geometric shape corresponding to the original porous metal form and having pore structure corresponding in volume to the metal in the original metal form plus the volume of the water which was removed by drying.

2. The method according to claim 1 wherein the step of impregnating is performed under a high vacuum.

3. The method according to claim 1 wherein the metal is removed from the plastic impregnated form by chemical dissolution.

4. The method according to claim 1 wherein the metal is removed from the plastic impregnated form by electrolytic dissolution.

5. The method according to claim 1 wherein the plastic impregnated form is heated to substantially above room temperature before removing the metal.

6. A method of making microporous fluorocarbon resin having a functional temperature in excess of 500° F. comprising the steps of impregnating a porous metal form with a fine dispersion of the fluorocarbon resin in water, drying the form to remove the water while leaving a residue of the fluorocarbon resin in the pores of the metal form, heating the fluorocarbon resin impregnated form to the fusion temperature of the fluorocarbon resin and for a period of time suffiicent to fuse the fluorocarbon resin in the porous and metal form, and removing the metal from the fluorocarbon resin impregnated form by dissolution thereby producing a microporous fluorocarbon resin having a geometric shape corresponding to the original porous metal form and having pore structure corresponding in volume to the metal in the original metal form plus the volume of water which was removed by drying.

7. The method according to claim 6 wherein the step of impregnating is performed under a high vacuum.

8. The method according to claim 6 wherein the porous metal form comprises a plaque of carbonyl nickel having a predetermined geometic shape.

9. The method according to claim 6 wherein the porous metal form comprises a plaque of carbonyl iron having a predetermined geometric shape.

10. A method of making a predetermined geometric shape of microprous ploytetrafluoroethylene having a functional temperature in excess of 500° F. comprising the steps of impregnating a porous metal form having the desired geometric shape with a fine dispersion of the polytetrafluoroethylene in water while subjecting the impregnation step to vacuum, drying the form to remove the water while leaving a residue of the polytetrafluoroethylene in the pores of the metal form, heating the polytetrafloroethylene impregnated form to a temperature and for a time suffiicent to fuse polytetrafluoroethylene in the pores of the metal form, and removing the metal from the polytetrafluoroethylene impregnated form by dissolution thereby producing a microporous polytetrafluoroethylene having geometric shape corresponding to the porous metal form and having pore structure corresponding in volume to the metal in the original metal form plus the volume of the water which was removed by drying.

11. A method of making a microporous plastic having a functional temperature in excess of 500° F. and having one side thereof non-porous comprising the steps of impregnating a porous metal form with a fine dispersion of the plastic in water, drying the form to remove the water while leaving a residue of the plastic in the pores of the metal form, heating the plastic impregnated form to a temperature and for a period of time sufficient to fuse the plastic in the pores of the metal form, removing the metal from the plastic impregnated form by dissolution thereby producing a microporous plastic having a geometric shape corresponding to the original porous form and having pore structure corresponding in volume to the metal in the original metal form plus the volume of water which was removed by drying, and thereafter coating one side of the microporous plastic with a fine dispersion of the plastic in water, drying the coated side of the microporous plastic to remove the water while leaving a residue of the plastic in the pores of the side of the microporous plastic, and repeating the last two steps of the foregoing method until the desired thickness of non-microporous plastic is obtained on the selected side of the microporous plastic.

12. A method of making a microporous plastic having a functional temperature in excess of 500° F. and having a non-porous side thereof comprising the steps of impregnating a porous metal form with a fine dispersion of the plastic in water, drying the form to remove the water while leaving a residue of the plastic in the pores of the metal form, laminating a solid sheet of plastic to one side of the plastic impregnated form by placing the solid sheet against the side of the plastic impregnated form under pressure, heating the plastic impregnated form and the laminated solid sheet of porous plastic to a temperature and for a period of time sufficient to fuse the plastic in the pores of the metal form, and removing the metal from the plastic impregnated form by dissolution thereby producing a microporous plastic having a geometric shape corresponding to the original porous form and having pore structure corresponding in volume to the metal in the original metal form plus the volume of the water which was removed by drying and one side of the microporous plastic having laminated thereto a solid non-porous sheet of the plastic material.

13. The method according to claim 1 wherein the ratio of the average particle size of the metal to that of the average particle size of the plastic is in the order of 10:1 or greater.

References Cited by the Examiner

UNITED STATES PATENTS

| | | | |
|---|---|---|---|
| 2,623,241 | 12/52 | MacKay et al. | 156—155 X |
| 2,838,829 | 6/58 | Goss et al. | 117—119 X |
| 3,009,207 | 11/61 | Romesburg et al. | |

FOREIGN PATENTS 552,914  2/58  Canada.

ROBERT F. WHITE, *Primary Examiner.*

MORRIS LIEBMAN, *Examiner.*